(12) United States Patent
Seel et al.

(10) Patent No.: US 8,433,464 B2
(45) Date of Patent: Apr. 30, 2013

(54) METHOD FOR SIMPLIFYING TORQUE DISTRIBUTION IN MULTIPLE DRIVE SYSTEMS

(75) Inventors: Andreas Seel, Hemmingen (DE); Holger Niemann, Ludwigsburg (DE); Oliver Kaefer, Murr (DE); Per Hagman, Alingsas (SE)

(73) Assignee: Robert Bosch GmbH, Stuttgart (DE)

( * ) Notice: Subject to any disclaimer, the term of this patent is extended or adjusted under 35 U.S.C. 154(b) by 670 days.

(21) Appl. No.: 12/086,533

(22) PCT Filed: Dec. 1, 2006

(86) PCT No.: PCT/EP2006/069189
§ 371 (c)(1),
(2), (4) Date: Sep. 9, 2010

(87) PCT Pub. No.: WO2007/077067
PCT Pub. Date: Jul. 12, 2007

(65) Prior Publication Data
US 2011/0010029 A1    Jan. 13, 2011

(30) Foreign Application Priority Data
Dec. 29, 2005   (DE) .......................... 10 2005 062 868

(51) Int. Cl.
*B60L 15/20*   (2006.01)
*B60W 20/00*   (2006.01)

(52) U.S. Cl.
USPC ....................................... 701/22; 180/65.265

(58) Field of Classification Search .................... 701/22; 180/65.21, 65.265; 307/9.1, 10.1, 10.7
See application file for complete search history.

(56) References Cited

U.S. PATENT DOCUMENTS

| 7,017,348 B2 | 3/2006 | Tajima et al. | |
| 8,167,066 B2* | 5/2012 | Joos et al. | 180/65.265 |
| 2010/0282532 A1* | 11/2010 | Falkenstein | 180/65.265 |

FOREIGN PATENT DOCUMENTS

| DE | 107 39 565 | 3/1999 |
| DE | 197 39 565 | 3/1999 |
| DE | 101 55 128 | 6/2002 |
| DE | 10 2004 013 581 | 11/2004 |
| DE | 103 20 017 | 12/2004 |
| DE | 10 2004 062 012 | 7/2006 |
| WO | WO 03/062004 | 7/2003 |

* cited by examiner

*Primary Examiner* — Yonel Beaulieu
(74) *Attorney, Agent, or Firm* — Kenyon & Kenyon LLP

(57) ABSTRACT

A method is provided for monitoring the torque distribution in multiple drive systems, e.g., in hybrid drives. The hybrid drive includes at least two individual drives which are controlled via an engine control unit, in which a torque distribution of a setpoint torque $M_{SETPOINT}$ to the at least two individual drives takes place. After the torque distribution, the formation of a resulting torque $M_{RES}$ takes place which is compared continuously with a torque before the torque distribution.

11 Claims, 2 Drawing Sheets

METHOD FOR SIMPLIFYING TORQUE DISTRIBUTION IN MULTIPLE DRIVE SYSTEMS

BACKGROUND OF THE INVENTION

1. Field of the Invention

The present invention relates to a method for simplifying the monitoring of torque distribution in multiple drive systems, in particular in hybrid drives of hybrid motor vehicles.

2. Description of Related Art

A control unit for the drive unit of a motor vehicle is known from published German patent document DE 103 20 017, the control unit in particular controlling or regulating the drive unit in regard to an output drive torque and the drive unit being an internal combustion engine of a motor vehicle. The motor vehicle typically includes a driver input transmission device actuatable by the driver of the motor vehicle, in particular a gas pedal actuatable using the foot. This is provided to output an output signal representing an instantaneous actuation state of the driver input transmission device. A control unit receives the output signal from the driver input transmission device and assigns the received output signal at least one setpoint output variable, which is in particular a setpoint drive torque of the drive unit. The drive unit is activated by the control unit in such a way that an actual output variable output by the drive unit approximates the setpoint output variable. Control units of this type are known in various designs for typical motor vehicle engines, in particular gasoline engines and diesel engines, e.g., Bosch engine-control systems having an electronic gas pedal (EGAS).

Furthermore, performing continuous torque monitoring to discover malfunctions in control units is known. This is used to protect passengers in the motor vehicle and to protect external traffic participants. Unintended acceleration of the vehicle is to be avoided by continuous torque monitoring. The core of continuous torque monitoring is a comparison of an actual torque provided by the engine to a permissible torque. In the normal case, the actual torque is less than the permissible torque. If the actual torque exceeds the permissible torque, an error exists in the engine control unit, and an error response resulting in a safer vehicle state is initiated. Monitoring of the engine control unit is typically performed according to a 3-level monitoring concept. The engine control itself, in particular presetting the setpoint torque, is performed in the first level, referred to as the functional level. The second level (monitoring level) is implemented as continuous torque monitoring. In this level, a permissible torque is ascertained as a function of vehicle and engine functions, inter alia, and compared to an actual engine torque. The second level is made secure in a complex manner, e.g., by double saving of all variables, cyclic RAM and ROM testing, program sequence controls, and command tests.

Published German patent document DE 107 39 565 describes a method for controlling the torque of a drive unit of a motor vehicle in which the torque of the drive unit is adjusted at least according to the driver input, the actual torque of the drive unit being determined and a maximum permissible torque being ascertained at least on the basis of the driver input. The torque is reduced and/or limited when the actual torque exceeds the maximum permissible torque. Then at least one operating state in which the torque of the drive unit is increased by an additional load is determined. During this at least one operating state, the maximum permissible torque is increased. The permissible torque is thereby increased in particular during operation with a cold drive unit and/or during operation of high-load consumers.

The above-described methods for torque monitoring from the related art may not be transferred to hybrid vehicles without further measures. In hybrid vehicles, at least one further torque source (motor) is used in addition to an internal combustion engine. In most cases, it is an electric drive. In the engine controller, the desired torque requested by the driver, which is set by operation of a gas pedal, must be distributed to the existing torque source, which includes at least two motors. This is performed as a function of numerous surroundings variables, inter alia, with the goal of setting the operating point which is most favorable for consumption for all torque sources, i.e., drive motors. The core of the above-mentioned continuous torque monitoring is the torque comparison in the second level, the monitoring level, in which a permissible torque of the second level (monitoring level) is compared to an actual torque in the second level (monitoring level). If the actual torque exceeds the permissible torque, a corresponding error response is initiated. The calculation of the permissible torque in the second level (monitoring level) forms the functionality of the first level, the functional level. In the second level (monitoring level), the calculations from the first level (functional level) are performed once again, but greatly simplified, to reduce possible errors. In hybrid vehicles, a torque request (setpoint torque) is sent to the individual torque sources, i.e., the motors, by the vehicle controller. The actually output torque (actual torque) may deviate from this setpoint torque, however, because the engine control units may have intrinsic functionalities which elevate torque, such as idling regulators and auxiliary system compensators. In addition, the inertia of the torque sources, i.e., the motors, causes a dynamic torque deviation. These deviations must be simulated in the calculation of the permissible torque in the second level (monitoring level) to prevent erroneous response of the torque monitoring unit. This, however, represents a very high level of complexity in regard to the development and calibration of the second level, i.e., the monitoring level in the vehicle control unit.

The calculations of the permissible torque in the monitoring level require mapping of the functionality of the first level, i.e., the function level in the second level, i.e., the monitoring level. In the second level, the calculations from the first level are performed again. To compensate for inaccuracies due to the simplifications implemented in the second level, i.e., the monitoring level, an "offset" is added to the determined result. In the case of vehicles having multiple motors, e.g., in the case of hybrid vehicles, a setpoint torque is distributed among the various torque sources, i.e., the individual drives of a multiple drive system, in the first level, i.e., the function level.

This distribution is complex and depends on a number of parameters, e.g., operating mode, operating strategy, condition of the individual drives, performance maps of individual drives, etc. For torque distribution monitoring according to the previous procedure, it was necessary for this complex distribution, which is performed in the first level, i.e., the function level, to be simulated in the monitoring level, i.e., in the second level, to confirm the distributed individual torques. A great development and application complexity is associated with the simulation of the function level of the first level, i.e., the function level, in the second level, i.e., the monitoring level. Furthermore, greater inaccuracies with regard to monitoring, i.e., a greater offset, are obtained due to the simplifications usually made in the monitoring level.

BRIEF SUMMARY OF THE INVENTION

According to the method of the present invention, a resulting setpoint torque after its distribution is compared to a permissible torque before distribution. Simulation of the torque distribution in the second level, the monitoring level of an engine control unit or a vehicle control unit, may thus be omitted. The distribution of the individual torques, e.g., individual setpoint torques $M_{SETPOINT, V}$ and $M_{SETPOINT, E}$ for the individual drives of a hybrid drive having at least one internal combustion engine and having at least one electric drive, is not critical for the acceleration of a vehicle having a multiple drive system, e.g., a hybrid drive, but instead the resulting setpoint torque is the deciding factor. Monitoring of resulting setpoint $M_{RES, SETPOINT}$ is achieved with the approach proposed according to the present invention, so that with a faulty distribution of the setpoint torque in the first level, i.e., the function level of the engine control unit, no error responses are triggered by the second level, i.e., the monitoring level, as long as resulting setpoint torque $M_{RES, SETPOINT}$ is fault-free.

The elimination of a simulation of the setpoint torque distribution in the second level, the monitoring level, of the engine control unit prevents a great complexity which would have been incurred in simulation of the setpoint torque distribution in the second level, i.e., the monitoring level. According to the method of the present invention, the variable that is actually safety-relevant for the acceleration of a vehicle having a multiple drive system, e.g., a hybrid drive, i.e., in the present case the formation of resulting setpoint torque $M_{RES, SETPOINT}$, is monitored.

The formation of resulting setpoint torque $M_{RES, SETPOINT}$ which takes place in the second level, i.e., the monitoring level, is an addition in the simplest case. In the case of complex drive train configurations, e.g., with a power-branching hybrid drive, to name one example, the coupling conditions of the individual drives of the hybrid drive are to be taken into account. With the method proposed according to the present invention, a continuous comparison of an ascertained permissible torque $M_{ZUL}$ with resulting torque $M_{RES, SETPOINT}$ which is formed instantaneously may preferably be performed in the second level, i.e., in the monitoring level, using setpoint torques $M_{SETPOINT, V}$ and $M_{SETPOINT, E}$ for the individual drives of the hybrid drive. Instead of setpoint torques $M_{SETPOINT, V}$ and $M_{SETPOINT, E}$, the particular actual torques, which in this case are acknowledged by the individual drives, e.g., at least one internal combustion engine and at least one electric drive, back to the second level, i.e., the monitoring level, of the engine control unit, may also be used for the comparison with permissible torque $M_{ZUL}$. In addition, it is also possible to compare permissible torque $M_{ZUL}$ with the actual torques of the individual drives instead of with setpoint torques $M_{SETPOINT, V}$ and $M_{SETPOINT, E}$. However, characteristic functionalities of the individual drives responsible for the deviations in the torque are to be taken into account in this variant of the method.

DETAILED DESCRIPTION OF THE INVENTION

Figure 1:
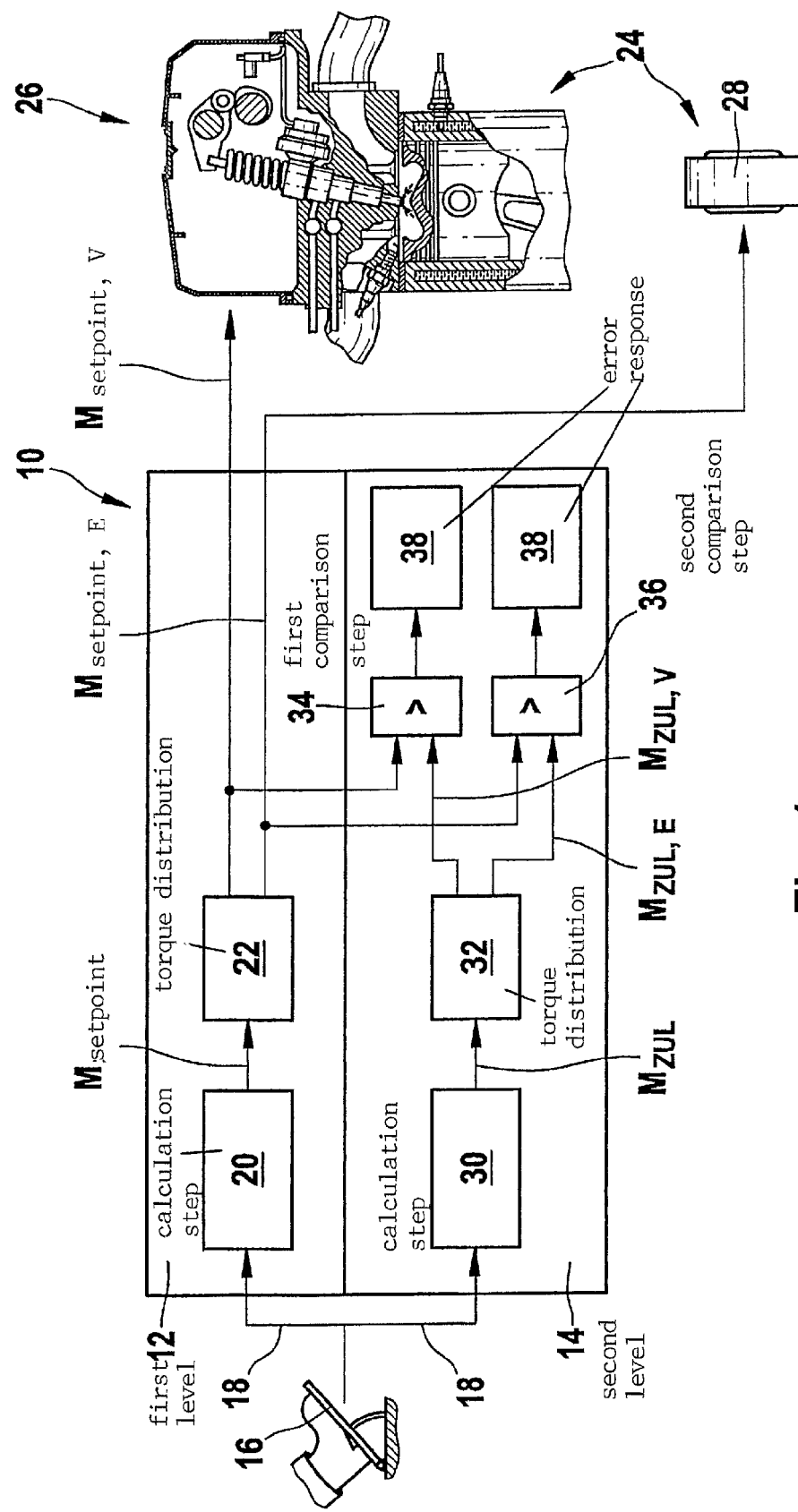
FIG. 1 shows an engine control unit of a multiple drive system in which torque distribution implemented in the first level, i.e., the function level, is simulated in the second level, i.e., the monitoring level.

FIG. 1 shows a schematic diagram of an engine control unit in which a torque distribution is performed in the first level (function level) as well as in the second level (monitoring level).

An engine control unit 10 shown in FIG. 1 includes a first level 12, which is the function level, and a second level 14, which is the monitoring level. Within the context of continuous torque monitoring, the stipulation of the setpoint torque which takes place in first level 12 (function level) is monitored via second level 14 (monitoring level). The driver input with regard to acceleration of the vehicle is transmitted to engine control unit 10 via a driver input transmission device embodied as a gas pedal 16. The driver input is transmitted to first level 12 (function level) and also to second level 14 (monitoring level) of engine control unit 10 as setpoint input 18. Within a calculation step 20, a setpoint torque $M_{SETPOINT}$ is ascertained in first level 12 (function level). Ascertained setpoint torque $M_{SETPOINT}$ is distributed to a setpoint torque $M_{SETPOINT, V}$ for an individual drive 26 of a hybrid drive 24 and to a setpoint torque $M_{SETPOINT, E}$ for an additional individual drive of a hybrid drive 24 in a torque distribution for the setpoint torque. Hybrid drive 24 also includes at least one internal combustion engine 26 and at least one electric drive 28 to which setpoint torque $M_{SETPOINT, V}$ and $M_{SETPOINT, E}$ distributed in torque distribution 22 are sent.

In second level 14 (monitoring level) a permissible torque $M_{ZUL}$ is ascertained in a calculation step 30. Ascertained permissible torque $M_{ZUL}$ is distributed to a permissible torque $M_{ZUL, E}$ for at least one electric drive 28 and a permissible torque $M_{ZUL, V}$ for at least one internal combustion engine 26 of hybrid drive 24 in a torque distribution 32, which is also implemented in second level 14 (monitoring level). Furthermore, second level 14 (monitoring level) also includes a first comparison step 34 and a second comparison step 36. In first comparison step 34, there is a continuous comparison of setpoint torque $M_{SETPOINT, V}$ with permissible torque $M_{ZUL, V}$ for individual drive 26, in the present case for the at least one internal combustion engine 26. For the case when setpoint torque $M_{SETPOINT, V}$ exceeds permissible torque $M_{ZUL, V}$, an error response 38 is triggered. Analogously a continuous comparison of setpoint torque $M_{SETPOINT, E}$ with permissible torque $M_{ZUL, E}$ for additional individual drive 28 of hybrid drive 24, in the present case for the at least one electric drive 28, takes place in second comparison step 36. Depending on the result of continuous comparison 36, an error response is triggered for the case when setpoint torque $M_{SETPOINT, E}$ exceeds permissible torque $M_{ZUL, E}$ for the at least one electric drive 28.

The concept for an engine control unit 10 depicted in FIG. 1 stipulates that torque distribution 22 implemented in first level 12 is also simulated in second level 14, the monitoring level. This is associated with a relatively high development and calibration complexity. Furthermore, because of the simplifications made in second level 14, the monitoring level, a greater inaccuracy is obtained with regard to the torque distribution, which is manifested in general by a greater deviation of permissible torques $M_{ZUL, V}$ and $M_{ZUL, E}$ from the actual torque values.

Figure 2:
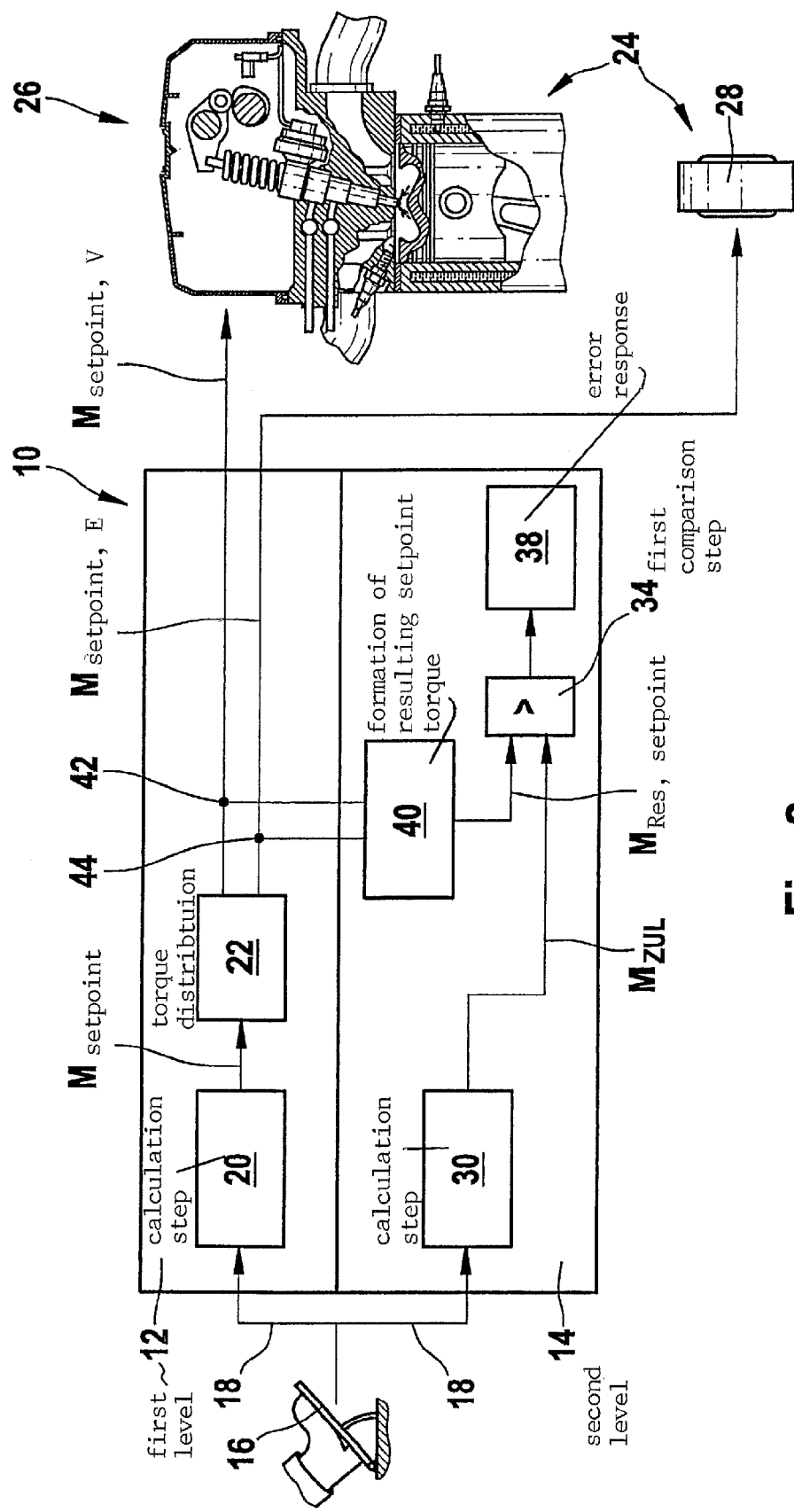
FIG. 2 shows an engine control unit in which torque distribution is implemented in the first level, i.e., the function level, and a resulting torque is ascertained in the second level, i.e., the monitoring level.

The diagram according to FIG. 2 illustrates the method proposed according to the present invention with the example of an engine control unit.

The diagram according to FIG. 2 shows that even in this case, a transfer of the driver input through a driver input transmission device embodied as gas pedal 16 is applied as setpoint input 18 to first level 12 (function level) as well as to second level 14 (monitoring level) of engine control unit 10. In first level 12 (function level), a setpoint torque $M_{SETPOINT}$ is ascertained in calculation step 20 and distribution of setpoint torque $M_{SETPOINT}$ to a setpoint torque $M_{SETPOINT, V}$ and a setpoint torque $M_{SETPOINT, E}$ is performed in torque distribution 22, which follows calculation step 20. The values of particular partial setpoint torques $M_{SETPOINT, V}$ and $M_{SETPOINT, E}$ are transmitted to pickups 42, 44 to a formation 40 implemented in second level 14 (monitoring level) of a resulting setpoint torque $M_{RES, SETPOINT}$. In the simplest case, this may be implemented as an addition step. In more complex drive train configurations, e.g., with a power-branching hybrid drive, the coupling conditions of at least one internal combustion engine 26 to at least one electric drive 28 of hybrid drive 24 are to be taken into account within the context of formation 40 of resulting setpoint torque $M_{RES, SETPOINT}$. In the case of power-branching hybrid drives, for example, the rotational speeds of the electric drives are to be taken into account as coupling conditions or, for example, the state of a separation coupling between internal combustion engine 26 and at least one electric drive 28 of the power-branching hybrid drive.

In second level 14 (monitoring level), permissible torque $M_{ZUL}$ is determined from setpoint input 18 in calculation step 30 and then is transmitted directly to first comparison step 34. Ascertained resulting setpoint torque $M_{RES, SETPOINT}$ is transmitted to first comparison step 34. Consequently in second level 14 (monitoring level), the torque distribution of permissible torque $M_{ZUL}$ to a permissible torque $M_{ZUL, E}$ for at least one electric drive 28 and $M_{ZUL, V}$, the permissible torque for at least one internal combustion engine 26 of hybrid drive 24, does not occur. Thus any errors occurring in first level 12 (function level) in the distribution of setpoint torque $M_{SETPOINT}$ in torque distribution 22 to setpoint torques $M_{SETPOINT, V}$ and $M_{SETPOINT, E}$ for at least one internal combustion 26 and at least one electric drive 28 do not trigger any errors in second level 14 (monitoring level) of engine control unit 10 as long as resulting torque $M_{RES, SETPOINT}$ remains below permissible torque $M_{ZUL}$ within the context of the continuous comparison in first comparison step 34. Thus, with the method proposed according to the present invention, the definitive variable for the acceleration of the vehicle having a hybrid drive 24, namely resulting setpoint torque $M_{RES, SETPOINT}$, is monitored continuously. Torque distribution 22 of setpoint torque $M_{SETPOINT}$ among individual setpoint torques $M_{SETPOINT, V}$ and $M_{SETPOINT, E}$ among individual drives 26, 28 of hybrid drive 24, which takes place in first level 12 (function level) of engine control unit 10, is not relevant for the variable that is actually safety relevant, i.e., resulting setpoint torque $M_{RES, SETPOINT}$ in the present case.

Although formation 40 of the resulting setpoint torque takes place based on individual setpoint torques $M_{SETPOINT, V}$ and/or $M_{SETPOINT, E}$ in the diagram according to FIG. 2 and resulting setpoint torque $M_{RES, SETPOINT}$ ascertained in this way is checked with permissible torque $M_{ZUL}$ ascertained in second level 14 (monitoring level) within the context of a continuous comparison 34, the actual torques of at least one internal combustion engine 26 and at least one electric drive 28 of hybrid drive 24 may also be applied to formation 40 of the resulting torque instead of individual setpoint torques $M_{SETPOINT, V}$ and $M_{SETPOINT, E}$. Again with this alternative, the distribution of the individual actual torques of the total actual torque is irrelevant as long as resulting actual torque $M_{RES, ACTUAL}$ is below permissible torque $M_{ZUL}$ calculated in second level 14 (monitoring level). If the actual torques are taken into account instead of individual setpoint torques $M_{SETPOINT, V}$ or $M_{SETPOINT, E}$, these are not calculated in second level 14 but instead are calculated in the particular drive control units and transmitted to second level 14, e.g., via a CAN bus. The resulting actual torque of the hybrid drive may be monitored in this way. However, if the resulting setpoint torque is monitored, a plausibility check may be performed on individual setpoint torques $M_{SETPOINT, V}$ and $M_{SETPOINT, E}$ in the particular engine control units.

What is claimed is:

1. A method for monitoring, by an engine control unit, torque distribution in a hybrid drive system having at least a first drive and a second drive, comprising:
    ascertaining, at least partially based on a driver input, an overall setpoint torque for the hybrid drive system;
    ascertaining, at least partially based on the driver input, a reference torque for the hybrid drive system;
    distributing the overall setpoint torque to the first and second drives, whereby the first and second drives are assigned corresponding component setpoint torques;
    ascertaining a resulting torque of the hybrid drive system; and
    continuously comparing the resulting torque with the reference torque.

2. The method as recited in claim 1, wherein the hybrid drive has at least one internal combustion engine and at least one electric drive, and wherein the resulting torque is formed from the component setpoint torques for the at least one internal combustion engine and the at least one electric drive.

3. The method as recited in claim 1, wherein the hybrid drive has at least one internal combustion engine and at least one electric drive, and wherein the resulting torque is formed from actual torques of the at least one internal combustion engine and the at least one electric drive.

4. The method as recited in claim 1, wherein the reference torque is permissible torque.

5. The method as recited in claim 2, wherein the engine control unit includes a first level and a second level, the second level being a monitoring level of the first level, and wherein the formation of the resulting torque is performed in the second level.

6. The method as recited in claim 2, wherein the formation of the resulting torque is performed by addition of the component setpoint torques.

7. The method as recited in claim 2, wherein the hybrid drive system is a power-branching hybrid drive system, and wherein the formation of the resulting torque in the power-branching hybrid drive system takes place by taking into account coupling conditions of the first drive and the second drive.

8. The method as recited in claim 3, wherein the formation of the resulting torque is performed by addition of the actual torques of the at least one internal combustion engine and the at least one electric drive.

9. The method as recited in claim 3, wherein the hybrid drive system is a power-branching hybrid drive system, and wherein the formation of the resulting torque in the power-branching hybrid drive system takes place by taking into account coupling conditions of the first drive and the second drive.

10. The method as recited in claim 4, wherein the permissible torque is ascertained in the second level of the engine control unit, and wherein the continuous comparison of the resulting torque and the permissible torque is performed in the second level of the engine control unit, and wherein an error response is triggered if the resulting torque exceeds the permissible torque.

11. An engine control unit for controlling torque distribution in a hybrid drive system having at least a first drive and a second drive, comprising:
    means for ascertaining, at least partially based on a driver input, an overall setpoint torque for the hybrid drive system;

means for ascertaining, at least partially based on the driver input, a reference torque for the hybrid drive system;

means for distributing the overall setpoint torque to the first and second drives, whereby the first and second drives are assigned corresponding component setpoint torques;

means for ascertaining a resulting torque of the hybrid drive system; and means for continuously comparing the resulting torque with the reference torque;

wherein the engine control unit includes a first level and a second level, the second level being a monitoring level of the first level, and wherein the distributing of the overall setpoint torque is performed in the first level and the ascertaining of the resulting torque is performed in the second level.

* * * * *

UNITED STATES PATENT AND TRADEMARK OFFICE
CERTIFICATE OF CORRECTION

PATENT NO.       : 8,433,464 B2
APPLICATION NO.  : 12/086533
DATED            : April 30, 2013
INVENTOR(S)      : Seel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1340 days.

Signed and Sealed this
Eighth Day of September, 2015

Michelle K. Lee
*Director of the United States Patent and Trademark Office*